United States Patent Office 3,439,058
Patented Apr. 15, 1969

3,439,058
PRODUCTION OF DIENES
Hubert Charles Bailey, Ealing, London, John Bentley Williamson, Sutton, and Clifford William Capp, Ewell, England, assignors to The Distillers Company Limited, Edinburgh, Scotland, a British company
No Drawing. Filed Sept. 16, 1966, Ser. No. 585,997
Claims priority, application Great Britain, Sept. 17, 1965, 39,675/65
Int. Cl. C07c 5/24
U.S. Cl. 260—669                    18 Claims

ABSTRACT OF THE DISCLOSURE

This invention has to do with a process for preparing a chemical compound having the grouping

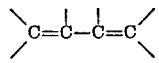

by reacting at a temperature in the range of 50 to 400° C. an unsaturated compound containing the grouping

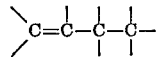

or the grouping

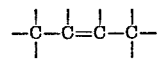

and a molecular oxygen containing gas in the presence of a platinum group metal catalyst. A carboxylic acid such as acetic acid may also be present in the reaction system. Gaseous diluents such as carbon dioxide, steam, volatile acids and mixtures thereof may be employed. The platinum group metal catalyst may also contain materials such as multivalent metals, acidic compounds, and mixtures thereof to promote the activity of the catalyst.

---

The present invention relates to the production of chemical compounds and in particular to such compounds containing a conjugated dienyl or alkenyl substituted aromatic grouping.

Accordingly the present invention is a process for the production of a chemical compound containing the grouping

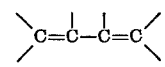

which comprises reacting at a temperature in the range 50 to 400° C. an unsaturated compound containing the grouping

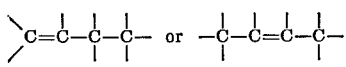

and a molecular oxygen containing gas in the presence of a platinum group metal catalyst.

The reaction may be carried out in the presence of a carboxylic acid, i.e., acetic acid.

The unsaturated compound starting material may be for example a straight or branched chain olefine, e.g., butene-1 or butene-2, giving rise to the production of the corresponding conjugated diolefine, e.g., butadiene and in addition, when the reaction is carried out in the presence of a carboxylic acid, to the production of a conjugated dienyl ester e.g., butadienyl acetate. Alternatively, the unsaturated compound starting material may be an alkyl substituted aromatic hydrocarbon e.g., ethyl benzene which gives rise to the production of styrene.

The molecular oxygen containing gas may be oxygen as such, air or mixture of air and oxygen.

The process may be carried out in the presence of gaseous diluents such as carbon dioxide, steam, and small quantities of volatile acids such as hydrogen chloride.

By the term "platinum group metal" is meant any of the metals platinum, palladium, rhodium, ruthenium, osmium or iridium. It is preferred to use the metals palladium or rhodium as catalysts.

The platinum group metal catalyst may be used in the form of the elemental metal or as a compound or salt such as palladium chloride or palladium oxide.

Compounds of metals of variable valence, e.g., vanadium, molybdenum, tungsten, copper and manganese, may be added to promote the activity of the catalyst.

The catalyst may be used in the form of a deposit on a support material. Support materials having a surface area greater than 10 sq. metres/gram are preferred. Examples of suitable support materials are diatomaceous earth, alumina, activated carbon, silica and titania.

The activity of the catalyst and the efficiency of the process depend on the acidity or basicity of the catalyst and its support, any may be modified by addition of, or treatment with, an acid or base. Thus it has been found that addition of acids such as sulphuric or phosphoric acids decreases the amount of carbon dioxide formed as by-product when using as catalyst, for example, palladium on carbon.

The activity of some solid catalysts decreases with use, particularly at lower temperatures, for example below 200° C. This decline in activity may be the result of an accumulation on the surface of by-products of low volatility, and in many cases the activity of a used catalyst can be completely restored by conventional treatments designed to remove accumulated deposits, such as heating in a flow of an oxygen-containing gas or steam, or washing with a liquid organic solvent, water or aqueous alkali. While it is probable that these treatments restore activity by removing accumulated by-products, it is also possible that they affect the catalyst in other ways. This washing with an acidic or basic liquid or solution may restore the catalyst surface to a required condition of acidity or basicity. The catalyst may be treated discontinuously as necessary to restore or promote its activity; it may also be washed continuously with a suitable liquid medium during the process.

It has been discovered that treatment before use of, for example, a catalyst consisting of palladium metal on carbon by heating in an oxygen-containing gas can increase its activity. This treatment has been observed to bring about the conversion of supported metallic palladium to palladium oxide; palladium oxide may be a desirable component of the catalyst.

The process of the present invention may be carried out by contacting the solid catalyst with reactants in the vapour phase. A liquid phase may also be present. For example the solid catalyst may be contacted with the molecular oxygen containing gas and with a liquid phase consisting of a suitable solvent. The unsaturated organic starting material and the carboxylic acid (if employed) may be present in a liquid phase. The process may be carried out by flowing the gas phase, or both the gas phase and liquid phase, over the catalyst on a solid support in a suitable tube or tower.

The process may also be carried out using the platinum group metal catalyst suspended or dissolved in a liquid medium. For example a palladium salt may be used dissolved in a polar solvent, together with a promoting additive, for example a copper salt, and the organic starting material.

The process may be carried out at sub-atmospheric, atmospheric or superatmospheric pressure. In general pressures of 1 to 20 atmospheres are suitable.

The process may be carried out over a wide range of elevated temperatures, the preferred temperature depending on the particular catalyst used. Where the catalyst is palladium on active carbon temperatures in the range 50° to 350° C., preferably 100° to 250° C. have been found suitable.

The process of the present invention is illustrated further with reference to the following examples.

EXAMPLE 1

A gaseous mixture of butene-1 (20 parts by volume) and oxygen (3 parts by vloume) was passed at the rate of 23 parts by volume per minute over 3 parts by volume of catalyst in a glass U-tube heated to 150° C. The catalyst consisted of 1% metallic palladium deposited on active carbon and had a bulk density of 0.5 g./ml. It was prepared by impregnating active carbon granules (Sutcliffe Speakman, Type 207C, surface area 1,000 sq. m./gm.) with a solution of palladium chloride followed by reduction with an alkaline solution of hydrazine hydrate. The catalyst was washed with distilled water until the washings were free from chloride ion and then dried at 110° C. The effluent gas was analysed.

EXAMPLES 2–5

Example 1 was repeated using various catalytic mixtures prepared in a similar manner and deposited on carbon, and in two cases using butene-2 instead of butene-1. Rates of production of butadiene-1,3 and of carbon dioxide are given in the table.

|  | Catalyst | | Rates of Production (Moles/litre catalyst/hr.) | |
|---|---|---|---|---|
| Olefine | Palladium, percent w./w. on carbon | Other components, percent w./w. on carbon | Butadiene | Carbon dioxide |
| Example No.: | | | | |
| 1 ............ Butene-1.... | 1 | None............................. | 0.16 | 0.21 |
| 2 ...................do....... | 1 | Phosphoric acid (1.1 percent P)... | 0.25 | 0.027 |
| 3 ...................do....... | 1 | Sulphuric acid (1.2 percent S)..... | 0.26 | 0.018 |
| 4 ............ Butene-2.... | 10 | Vanadium (2%).................... | 0.072 | 0.76 |
| 5 ...................do....... | 1 | Phosphoric acid (1.1 percent P)... | 0.022 | 0.025 |

Example 1 was repeated, except that before passing over the catalyst, the gas mixture was passed through liquid acetic acid at 55° C. so as to saturate the mixture with acetic acid vapour at this temperature. Products were obtained at the following rates:

Moles/litre catalyst/hour
Butadiene _____ 0.20
Butenyl acetates _____ 0.03
Butadienyl acetates _____ 0.01
Carbon dioxide _____ 0.07

EXAMPLE 7

Example 6 was repeated, using as catalyst 10% palladium and 2% vanadium on carbon. Products were obtained at the following rates:

Moles/litre catalyst/hour
Butadiene _____ 0.17
Butenyl acetates _____ 0.07
Butadienyl acetates _____ 0.04
Carbon dioxide _____ 0.45

EXAMPLE 8

Example 7 was repeated with butene-2 instead of butene-1. Products were obtained at the following rates:

Moles/litre catalyst/hour
Butadiene _____ 0.04
Butenyl acetates _____ 0.04
Butadienyl acetates _____ 0.02
Carbon dioxide _____ 0.50

EXAMPLE 9

Example 1 was repeated, except that before passing over the catalyst the gas mixture was passed through liquid water at 55° C. so as to saturate the mixture with water vapour at this temperature. Products were obtained at the following rates:

Moles/litre catalyst/hour
Butadiene _____ 0.17
Carbon dioxide _____ 0.16

EXAMPLE 10

A catalyst consisting of 1% metallic palladium deposited on active carbon of a bulk density 0.5 g./ml. was prepared by impregnating active carbon granules with a solution of palladium chloride followed by reduction with an alkaline solution of hydrazine hydrate. The catalyst was washed with distilled water until the washings were free from chloride ion and then dried at 110° C.

Helium was passed at the rate of 20 parts by volume per minute through liquid ethyl benzene at 80° C. so as to saturate the gas with ethyl benzene vapour at this temperature, mixed with oxygen (3 parts by volume per minute), and the resultant mixture was passed over 3 parts by volume of catalyst in a glass U-tube heated to 150° C. The effluent gas was analysed.

EXAMPLE 11

Example 10 was repeated with the exception that the catalyst was heated to 180° C.

EXAMPLES 12–14

A catalyst consisting of 1% metallic palladium deposited on active carbon, prepared as for Example 10, was impregnated with an aqueous solution of an acid and dried at 110° C. This material was used as catalyst as in Examples 10 and 11.

Results obtained are given in the table:

|  | Added Acid, Percent w./w. on carbon | Temperature, ° C. | Rate of production Moles/litre catalyst/hour | |
|---|---|---|---|---|
|  |  |  | Styrene | Carbon dioxide |
| Example: | | | | |
| 10 ............... None................ | | 150 | 0.061 | 0.095 |
| 11 ...................do................ | | 180 | 0.15 | 0.61 |
| 12 ............ Sulphuric acid, 3.6% $H_2SO_4$.... | | 150 | 0.15 | 0.006 |
| 13 ............ Phosphoric acid, 3.6% $H_3PO_4$... | | 150 | 0.11 | 0.013 |
| 14 ...................do................ | | 180 | 0.38 | 0.061 |

EXAMPLE 15

A catalyst consisting of 10% metallic palladium deposited on active carbon was prepared as in Example 1. A sample of this catalyst was used for the process as in Example 1. After prolonged use, the activity of the catalyst dropped to about a third of its original value. The used catalyst was reactivated by heating at 215° C. for 18 hours under a stream of 13% oxygen in helium, and the reactivated catalyst reused for the process.

EXAMPLE 16

A sample of the catalyst prepared in Example 15 was, before use, pretreated by heating for 72 hours at 150° C. under a stream of 13% oxygen in helium. X-ray diffraction analysis of the pretreated catalyst indicated the presence of palladium oxide (PdO). Results obtained were as follows:

| Example No. | Catalyst | Rate of Production (moles/litre catalyst/hr.) | |
|---|---|---|---|
| | | Butadiene | Carbon dioxide |
| 15 | Fresh | 0.34 | 0.47 |
| | Used, Before reactivation | 0.12 | 0.12 |
| | Used, After reactivation | 0.36 | 0.11 |
| 16 | Pretreated | 0.61 | 0.59 |

EXAMPLE 17

A gaseous mixture of butene-1 (10 parts by volume), helium (10 parts by volume) and oxygen (3 parts by volume) was passed at the rate of 23 parts by volume per minute over 3 parts by volume of a catalyst in a glass U-tube heated to 150° C. The catalyst was a sample of that prepared in Example 15. Butadiene was produced at the rate of 0.36 mole/litre catalyst/hour.

EXAMPLE 18

Example 17 was repeated with the helium replaced by steam. Butadiene was produced at the rate of 0.58 mole/litre catalyst/hour.

EXAMPLE 19

A catalyst consisting of 2% metallic palladium on alumina was prepared by impregnating alumina ("Alcoa," Type F10, surface area 100 sq. m./g.) with a solution of palladous chloride followed by reduction with an alkaline solution of hydrazine hydrate, washing with water and drying at 110° C. This was used as in Example 1 at 150° and at other temperatures.

EXAMPLES 20–22

Catalysts consisting of platinum group metal halides (2% calculated as the metal) on solid supports were prepared by impregnating carbon or alumina with solutions of the halides and drying. They were used as in Example 1 but at different temperatures.

EXAMPLES 23–25

Catalysts consisting of 2% platinum group metal on a support were prepared by impregnating carbon or alumina with solutions of platinum group metal halides, drying, and reducing the halides by treating at 150° C. with hydrogen. They were used as in Example 1, but at different temperatures.

EXAMPLE 26

A catalyst consisting of 5% palladium on a mixed titania/sodium metasilicate support was prepared by mixing equal amounts of titania and sodium metasilicate and adding enough water to make a slurry. The slurry was dried at 140° C., a solution of palladium chloride in 50% hydrochloric acid was added, and after drying at 140° the catalyst was reduced with alkaline hydrazine. The catalyst was used as in Example 1, but at 180° C.

| Example No.: | Catalyst | Temp., ° C. | Rate of production of butadiene moles/litre catalyst/hour |
|---|---|---|---|
| 19 | Pd metal on alumina | 150 | 0.40 |
| | | 215 | 0.63 |
| | | 250 | 0.61 |
| 20 | PdCl₃ on carbon | 215 | 0.19 |
| 21 | RuCl₃ on carbon | 215 | 0.06 |
| 22 | RuCl₃ on alumina | 180 | 0.10 |
| | | 215 | 0.10 |
| 23 | Pt metal on carbon | 215 | 0.05 |
| 24 | Rh metal on carbon | 180 | 0.07 |
| 25 | Ph metal on alumina | 180 | 0.13 |
| 26 | Pd metal on sodium silicate/titania | 215 | 0.50 |

EXAMPLE 27

A mixture of 0.7 part palladous chloride, 2.1 parts cupric acetate, 14 parts octene-1 and 21 parts glacial acetic acid was agitated under air for 24 hours at 150° C. A mixture of octadienes was recovered from the product.

EXAMPLE 28

Helium was passed at the rate of 20 parts by volume per minute through liquid ethyl benzene at 60° C. so as to saturate the gas with ethyl benzene at that temperature, mixed with oxygen (3 parts by volume per minute) and the resultant mixture passed over 3 parts by volume of a catalyst in a glass U-tube heated to 250° C. The catalyst consisted of 2% metallic palladium on alumina prepared as in Example 19. Styrene was produced at the rate of 0.22 mole/litre catalyst/hour.

EXAMPLE 29

Helium was passed at the rate of 20 parts by volume per minute through liquid 4-methyl pentene-1 at 25° C. so as to saturate the gas with vapour of the olefine at that temperature, mixed with oxygen (3 parts by volume per minute) and the resultant mixture passed over 3 parts by volume of a catalyst in a glass U-tube heated to 180° C. The catalyst consisted of 2% metallic palladium on alumina prepared as in Example 19. Methyl pentadiene was recovered from the effluent gas.

EXAMPLE 30

Example 29 was repeated, except that cumene at 80° C. was used instead of methyl pentene at 25° C. α-Methyl styrene was recovered from the effluent gas.

We claim:
1. A process for the production of a chemical compound containing the grouping

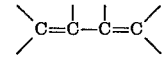

which comprises reacting at a temperature in the range 50 to 400° C. an unsaturated compound containing the grouping selected from

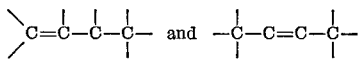

and a molecular oxygen containing gas in the presence of a platinum group metal catalyst and a carboxylic acid.

2. A process as claimed in claim 1, wherein the carboxylic acid is acetic acid.

3. A process as claimed in claim 1, wherein the unsaturated compound starting material is selected from the group consisting of straight and branched chain olefines.

4. A process as claimed in claim 3 wherein the olefine is selected from the group consisting of butene-1 and butene-2.

5. A process as claimed in claim 1 wherein the unsaturated compound starting material is an alkyl substituted aromatic compound.

6. A process as claimed in claim 5 wherein the alkyl substituted aromatic compound is ethyl benzene and the reaction product is styrene.

7. A process as claimed in claim 1 carried out in the presence of gaseous diluents selected from the group consisting of carbon dioxide, steam and mixtures thereof, optionally together with small quantities of a volatile acid.

8. A process as claimed in claim 7 wherein said volatile acid is hydrochloric acid.

9. A process as claimed in claim 1 wherein the catalyst comprises the elements selected from the group consisting of palladium and rhodium.

10. A process as claimed in claim 1 wherein the platinum group metal catalyst is used in the form of the elemental metal.

11. A process as claimed in claim 1 wherein the platinum group metal catalyst is used in the form selected from the group consisting of a compound, salt and oxide of the metal.

12. A process as claimed in claim 11 wherein the catalyst is palladium chloride.

13. A process as claimed in claim 1 wherein the catalyst is deposited on a support material.

14. A process as claimed in claim 13 wherein the support material has a surface area greater than 10 sq. metres/gram.

15. A process as claimed in claim 14 wherein the support material is selected from the group consisting of diatomaceous earth, alumina and activated carbon.

16. A process as claimed in claim 1 wherein the catalyst additionally contains materials selected from the group consisting of compounds of multivalent metals, acidic compounds and mixtures thereof.

17. A process as claimed in claim 1 carried out under pressures of 1 to 20 atmospheres.

18. A process for the production of a chemical compound containing the grouping

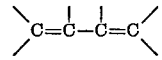

which comprises reacting at a temperature in the range 50 to 400° C. an unsaturated compound containing the grouping selected from

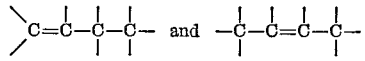

and a molecular oxygen containing gas in the presence of a platinum group metal catalyst, wherein the catalyst additionally contains phosphoric acid, sulfuric acid or compounds of vanadium, molybdenum, tungsten, copper or manganese.

References Cited
UNITED STATES PATENTS 3,168,587  2/1965  Michaels et al. _____ 260—680
3,268,612  8/1966  Bajars _____ 260—680

DELBERT E. GANTZ, *Primary Examiner.*

CURTIS R. DAVIS, *Assistant Examiner.*

U.S. Cl. X.R.
260—680, 683.3

U.S. DEPARTMENT OF COMMERCE
PATENT OFFICE
Washington, D.C. 20231

UNITED STATES PATENT OFFICE
CERTIFICATE OF CORRECTION

Patent No. 3,439,058                                April 15, 1969

Hubert Charles Bailey et al.

It is certified that error appears in the above identified patent and that said Letters Patent are hereby corrected as shown below:

In the heading to the printed specification, line 9, after "39,675/65" insert -- ; Oct. 13, 1965, 43,400/65 --. Column 1, line 58, "i.e.," should read -- e.g., --; line 70, "mixture" should read -- mixtures --. Column 3, before line 43, insert -- EXAMPLE 6 --. Columns 5 and 6, in the table, second column, line 4 thereof, "$RuCl_3$ on alumina" should read -- $RhCl_3$ on alumina --. Column 6, line 39, "mole/litre" should read -- moles/litre --.

Signed and sealed this 14th day of April 1970.

(SEAL)
Attest:

Edward M. Fletcher, Jr.                          WILLIAM E. SCHUYLER, JR.
Attesting Officer                                     Commissioner of Patents